3,539,472
PROCESS FOR MOLDING ARTICLES
FROM METAL POWDERS
Gerhard Findeisen, Braunau am Inn, and Walter Brotz,
Gersthofen, Germany, assignors to Farbwerke Hoechst
Aktiengesellschaft vormals Meister Lucius & Bruning,
Frankfurt am Main, and Mannesmann-Pulvermetall
G.m.b.H., Monchen-Gladbach, Germany
No Drawing. Filed Dec. 21, 1967, Ser. No. 692,315
Claims priority, application Germany, Dec. 23, 1966,
F 51,060
Int. Cl. B22f 1/00; C10m 1/32
U.S. Cl. 252—51.5    3 Claims

ABSTRACT OF THE DISCLOSURE

Molded metal powder articles which are converted into shaped articles of sintered metal by annealing, are produced in the presence of mold-facilitating mixtures consisting of amides or diamides of aliphatic monocarboxylic acids and alcohols or diols or polyglycols.

---

The present invention provides a process for producing molded articles from metal powders in the presence of lubricants.

For producing sintered precision articles, it is important to compress the powder or mixture of powders to obtain a pressed article. The production of precision articles consists in directly molding an article to its final shape while allowing for a linear dimensional tolerance in the range of from about 0.1 to 1%. This means that the male and female molds of the compression tool have to be fabricated and fitted with a narrow tolerance and the more complicated the shape of the precision articles to be molded, the more complicated molds are necessary. A close fit of the molds is spoiled by the wear and tear caused by the friction of the powder aaginst the female and male molds and of the molded articles against the male and female molds. The complicated shape of the mold involves the risk that the individual parts of the male or female mold break.

For the production of precision articles, the molding in only one space axis is generally applied in industry. In most cases, therefore, sintered precision articles can only be produced by the molding technique if, in principle, they represent a prism having the base of any polygon, different levels being, however, possible. The powder is loosely introduced into the female mold in a dry-pulverulent state. The molding process provides an article which not only has a considerably stability, but the molded article produced is also crammed into the female mold (in which it has been formed) to such an extent that, in an unfavorable case, the force required for molding the article is the same as that necessary for ejecting the molding part from the female mold. Thus, two operations have to be considered: (1) molding the article; (2) ejecting the molded article.

The molding operation causes a friction of the powder particles against one another and against the wall of the female mold. In the ejecting operation, the friction of the particles against one another can be neglected, for, in this case, the friction of the molded article against the wall of the female mold prevails.

Both during the molding and the ejecting operations, the friction has to be reduced by lubrication to assure a technically reasonable life of the female mold, to mold at the highest possible molding pressure and to produce at a high and thus economical stroke rate of the compression mold. The hitherto, used lubrication methods, however, solve the problem in only an unsatisfactory manner. Two processes are used, of which the one consists in applying a lubricant to the wall of the female mold before introducing the powder to be molded, the other consists in adding the lubricant to the metal powder to be molded. The process of the first-mentioned type did not gain importance in industry since it requires a great expenditure for construction and the molding operation is aggravated owing to the absence of an internal lubrication between the metal powder particles, whereas the process of the second type is generally used in our days. Proposed lubricants suitable for this process are, for example, oils, fats, waxes, paraffins, sulfides, phosphates, graphite and metal salts of organic acids. The zinc salt of stearic acid has hitherto been predominantly used.

It has also been proposed to use wax-like amides such as di-stearoyl-ethylene diamide. Although these amides are effective during the molding process, their effect in the ejection is completely unsatisfactory.

The suitable lubricant chosen must, however, not only have a good sliding property, but it must also not detract from the flow properties of the metal powder and it must, moreover, easily be removed, without any remainder, from the molded article during the subsequent annealing process carried out at a temperature 0.5 to 0.9 times the melting temperature of the molded article. Since the lubricants or their decomposition products which evaporate during the annealing process, soil the annealing furnaces, a well appropriate lubricant has also to meet the requirement that the evaporation remainders formed hamper the operation in the annealing furnace as little as possible. The hitherto used zinc stearate does not meet this requirement since the zinc evaporating from the molded articles deposits in the passage of the furnace, thus requiring undesirably frequent repair of the furnace.

The problem of lubrication, however, has hitherto been solved in an unsatisfactory manner especially since two kinds of friction have to be dealt with by the lubricating technique: in the molding operation, the elements taking part in this process are subject to a high pressure per unit of area and to a low sliding speed; when the molded article is being ejected, the pressure per unit of area is weak and the sliding speed is high. It has, therefore, already been proposed to use mixtures of lubricants, for example zinc stearate and stearic acid, in which the first component is to be effective in the molding process and the second component during the ejection. Compared with the use of pure zinc stearate, however, this process only provides minor advantages which are outweighed by the disadvantages to be put up with, such as zinc deposits in the furnaces and, especially, a very detrimental effect on the flow properties of the metal powders.

To overcome these disadvantages, it was necessary to find a lubricating method suitable for two essentially different kinds of friction. Such a lubrication must not adversely affect the flow properties of the metal powder; moreover, when the molded articles are annealed, the lubricant used is expected to be decomposed to substances which do not hamper the operation of the furnace. Finally, the lubrication should not require an expensive additional device to the metal powder mold.

We have now found that molded articles can advantageously be produced from metal powders with the aid of mold-facilitating lubricants by adding mixtures consisting of amides or diamides of aliphatic monocarboxylic acids having from 10 to 32 carbon atoms in the molecule, and alcohols or diols having from 6 to 32 carbon atoms, or polyglycols having a molecular weight in the range of from 500 to 50,000, to the metal powders to be molded, prior to the known molding process, as mold-facilitating lubricants in amounts ranging from 0.1 to 5% by weight, calculated on the amount of the metal powder.

The lubricant to be used according to the invention is a cation-free combination comprising two components which are not, or only partially, compatible with one another. The amide component is preferably effective during the molding operation, i.e. at a high pressure per unit of area and a low sliding speed, whereas the alcohol component facilitates the ejection taking place at a weak pressure per unit of area and a high sliding speed. Since the two components of the mixture are sufficiently dry powders, the flow properties of the metal powder are not affected. The lubricant mixtures are, moreover, distinguished by the fact that, during the annealing process of the molded metal powder articles prepared with their aid, they are easily removed therefrom and completely burnt range of from 500 to 50,000. Octadecane-diol-(1,18) has proved to be especially useful.

The combinations of lubricants of the invention, which are added to the metal powders in an amount in the range of from 0.1 to 5% by weight, preferably from 0.3 to 1% by weight, calculated on the weight of the metal powder, are suitable as mold-facilitating additives for almost all metal powders, preferably for molding iron powder.

The following examples serve to illustrate the invention, but they are not intended to limit it thereto.

EXAMPLES 0.5% by weight of a lubricating substance (consisting of an amide as the basic substance and a mono- or poly-ol as the additive) was added to iron powder and the whole was homogeneously mixed. 33 grams of the mixture were then molded into a cylinder having a diameter of 20 millimeters, under a pressure of 6 mp./cm.$^2$. The ejecting force and the density obtained were determined afterwards. Moreover, the flow properties of this mixture were measured by determining the period in seconds, during which an amount of 50 grams passed through a standardized funnel. The values obtained with the use of different lubricants are compiled in the following table.

TABLE 1

| | Lubricant consisting of— | | Density of the molded article (gram/cc.) | Specific ejecting force (kp./cm.$^2$) | Flow properties (seconds/ 50 grams) | Observation |
|---|---|---|---|---|---|---|
| Percent by weight | Basic substance [1] | Additive | | | | |
| 100 | I | | | | ($^2$) | Burnt in the furnace without leaving remainders. |
| 100 | II | | 6.76 | 266 | 33 | |
| 98 | II | 2 hexane-diol-(1,6) | 6.75 | 166 | 34 | |
| 95 | II | 5 hexane-diol-(1,6) | 6.72 | 154 | 34 | |
| 98 | II | 2 polyglycol 6,000 | 6.71 | 175 | 37 | |
| 95 | II | 5 polyglycol 6,000 | 6.72 | 196 | 32 | |
| 98 | II | 2 bis-phenol-bis-glycol ether.[3] | 6.72 | 166 | 33 | |
| 95 | II | 5 bis-phenol-bis-glycol ether.[3] | 6.70 | 170 | 33 | |
| 98 | II | 2 stearyl alcohol | 6.71 | 175 | 34 | |
| 95 | II | 5 stearyl alcohol | 6.71 | 184 | 34 | |
| 98 | II | 2 cetyl alcohol | 6.71 | 175 | 35 | |
| 95 | II | 5 cetyl alcohol | 6.72 | 191 | 34 | |
| 98 | II | 2 octadecane-diol-(1,18) | 6.72 | 114 | 34 | |
| 95 | II | 5 octadecane-diol-(1,18) | 6.71 | 145 | 35 | |
| 100 | III | | 6.76 | 272 | 35 | Left metallic zinc in the furnace. |

[1] I means coconut oil fatty acid amide.
II means bis-stearoyl-ethylene-diamide.
III means zinc stearate.
[2] Does not flow, in lumps.
[3]

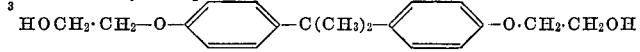

so that no remainders are left in the passages of the furnace.

The combinations of lubricants to be used according to the invention are obtained by mixing from 90 to 99.9% by weight of the amide component with 10 to 0.1% by weight of the alcohol component. Mixtures prepared from 96 to 99% by weight of amide and from 4 to 1% by weight of mono- or di-ol, are preferred.

Suitable amides or diamides are those obtained from saturated aliphatic monocarboxylic acids having from 10 to 32 carbon atoms, and ammonia or aliphatic diamines having up to 6 carbon atoms, for example stearic acid amide, coconut oil fatty acid amide, palmitic acid amide, bis-stearoyl-methylene diamide and, preferably bis-stearoyl-ethylene diamide.

The alcohols having a higher molecular weight, are aliphatic straight-chain mono- and di-ols having from 6 to 32 carbon atoms in the molecule, for example stearyl alcohol, cetyl alcohol, hexane-diol-(1,6), octane-diol-(1,8), octadecane-diol, and diols such as can be prepared by reacting ethylene oxide with bis-phenols, for example bis-glycol monoether of p,p'-isopropylidene-diphenol, furthermore, polyglycols having a molecular weight in the

What is claimed is:

1. A process for moulding articles from metal powder with mold facilitating lubricants comprising initially admixing the metal powder with 0.1 to 5% by weight, calculated on powder weight, of a lubricant consisting essentially of
   (A) 90–99.9% by weight of an amide or diamide of an aliphatic straight chain monocarboxylic acid of 10–32 carbon atoms reacted with ammonia or an aliphatic diamine having up to 6 carbon atoms, with
   (B) 10–0.1% by weight of an aliphatic straight chain monohydric or dihydric alcohol of 6–32 carbon atoms or a polyglycol having a molecular weight in the range of from 500 to 50,000;
and molding the resulting mixture.

2. A process of claim 1, wherein the (A) component is bis-stearoyl-ethylene-diamine and the (B) component is octadecane-diol-(1,18).

3. Lubricant-containing metal powders suitable for molding metal powder articles, which metal powders comprise 100 parts by weight of a pulverulent metal and from 0.1 to 5 parts by weight of a lubricant combination consisting essentially of a mixture of about 90–99% by weight of an amide or diamide of an aliliphatic monocarboxylic acid having from 10 to 32 carbon atoms, and 10-0.1% by weight of an aliphatic monohydric or dihydric alcohol of 6-32 carbon atoms, or polyglycol having a molecular weight in the range of from 500 to 50,000.

References Cited

UNITED STATES PATENTS

| | | | |
|---|---|---|---|
| 1,873,223 | 8/1932 | Sherwood | 264—111 X |
| 2,298,908 | 10/1942 | Wentworth | 264—111 X |
| 3,318,986 | 5/1967 | Fraser et al. | 264—111 |
| 3,340,024 | 9/1967 | Mahar | 264—111 X |
| 2,244,705 | 6/1941 | Hutchinson et al. | 252—52 X |
| 2,393,800 | 1/1946 | Morgan et al. | |
| 2,665,312 | 1/1954 | Ohlmann et al. | 252—52 X |
| 3,021,941 | 2/1962 | Huet. | |
| 3,312,620 | 4/1967 | Low et al. | |

DANIEL E. WYMAN, Primary Examiner

W. J. SHINE, Assistant Examiner

U.S. Cl. X.R.

252—52; 264—111